HENRY T. HOESLI
INVENTOR
BY
Nilsson, Robbins & Anderson
ATTORNEYS

HENRY T. HOESLI
INVENTOR
BY
Nilsson, Robbins & Anderson
ATTORNEYS.

United States Patent Office 3,529,082

Patented Sept. 15, 1970

3,529,082

MULTIDIMENSIONAL ELECTRICAL-OPTICAL TRANSMITTING AND REPRODUCING SYSTEM

Henry T. Hoesli, Saugus, Calif.

Filed Feb. 16, 1967, Ser. No. 616,729
Int. Cl. H04n 9/56, 9/58
U.S. Cl. 178—6.5 4 Claims

ABSTRACT OF THE DISCLOSURE

The specification discloses, as an example of the invention, a means for developing a sterescopic pair of horizontally striated images of a three dimensional object field. The image pairs are then combined in an optically interlaced manner, and recorded, or transmitted via substantially conventional television means. The receiver displays a representation of the composite interlaced image and a separating grid having a horizontal grating or striation pattern correlated to the original image striations is disposed a predetermined, relatively short distance in front of the cathode ray tube display screen. The striations of the separating grid serve to mask one interlaced half of the composite display; which half is masked depends upon the relative elevation of the viewing eye. When the relative elevation of the eyes are slightly different, one eye sees one stereoptic half image and the other eye by virtue of the parallax of the masking separating grid, sees only the other stereoptic half image.

This invention relates generally to multidimensional visual presentation and more particularly to a novel three dimensional electrical and optical system for generating electrical signals representative of a three dimensional object field and for subsequently providing a visually three dimensional display recreative of the three dimensional object field.

BACKGROUND OF THE INVENTION

Although the present invention finds particularly advantageous application in the field of three dimensional or stereoscopic commercial television, and although in the cause of brevity and clarity, much of the following discussion and description of examples of the invention relate thereto, it is expressly to be understood that the advantages of the invention are equally well manifest in other fields wherein generation and storage or transmission of electrical video or optical analog signals containing stereoscopic or multidimensional information or their subsequent multidimensional visual presentation such as in applications of industrial or research television, radar display, data processing, certain public motion pictures, or the like.

The known advantages and desirability of three dimensional television, particularly such as would provide realistic perspective, are as old as the development of television. The viewing public, already well accustomed to viewing the two dimensional representation such as a planar photograph, of a three dimensional object has readily accepted the same limitation in its television viewing. A great deal of research effort has been expended in various efforts to develop practical and acceptable systems which will convey to the viewer the proper and realistic stereoptic presentation of the object field seen at the camera or vidicon.

Many systems and devices have been suggested or presented to the market and to governmental agencies for acceptance or approval. Some of the proposed devices have provided solutions to many of the problems incumbent in furnishing a practical three dimensional television presentation. For example, some of the prior art approaches have resulted in a visual presentation which is an acceptable three dimensional representation of the object field; however, such systems heretofore known are so formidably complex and costly as to be unacceptable in the past and not likely to achieve significant acceptance in the future. Furthermore, such prior art systems typically require wider than the heretofore permitted bandwidth for television broadcasting and have therefore not been approvable by governmental agencies except for such limited instances as experimental or closed circuit use.

Still other systems have required that the viewer wear specially colored, polarized or vibrating goggles or the like or that his vision be otherwise bifurcated spatially or sequentially by such objectionable methods. Some such bifurcating techniques, for example, require that the individual eyes of the viewer be held in a predetermined location on either side of an optical septum in order that each eye will see only its intended stereoscopic image.

Still other prior art systems utilizing cathode ray tube displays are capable of providing a third dimension on the viewing screen; however, the result is generally an isometric or other distortion from the true perspective and is, at best, merely analogous to a true spatially perspective presentation.

Accordingly, it is an object of the present invention to provide a novel stereoptic method and system which is not subject to these and other limitations and disadvantages of the prior art.

It is another object to provide such a system capable of presenting to a viewer, remote in time or distance or both from a three dimensional object field, a stereoptically complete and accurate representation of the three dimensional object field.

It is another object to provide such a system which is mechanically, optically, and electrically straightforward, inexpensive, reliable, and easily maintained over a long service life.

It is another object to provide such a system which incorporates no moving elements, such as, for example, image bifurcating devices, either at the camera or at the ultimate display.

It is another object to provide such a system which requires no special equipment such as, for example, goggles or orthogonally polarized glasses to be worn by the viewer, and which does not permit only one viewer to observe the stereoptic display or require that he be positioned in the specific or fixed location.

It is another object to provide such apparatus which does not require increased carrier bandwidth for broadcast transmission.

It is another object to provide such apparatus which is totally compatible with existing commercial television systems operated in accordance with present United States Federal Communication Commission standards.

It is another object to provide such a system to which current standard and color television systems are adaptable.

It is another object to provide such a system the display facility of which permits the viewer or group of viewers to move extensively without comprising the quality of the three dimensional viewing.

SUMMARY

Very briefly, these and other objects are achieved in accordance with the structural aspects of one example of the invention which includes, at the electrical-optical input end, a pair of vertically oriented first surface mirror elements laterally and stereoptically spaced horizontally and complementarily from each other with respect to their line of view toward the three dimensional object field;

these mirror elements may be designated as left and right stereoptic input elements.

One of each of the mirror elements is provided with a masking grid comprised of relatively fine horizontal striations causing the mirror to reflect one half of the image from the object field. Each half of the mirror element pair transmits, (reflectingly) a stereoptic half image which is spatially the complement of the other whereby the outputs, if combined, of the mirror pair constitute the stereoptical information of the complete image of the object field.

Optical means, then, are provided for combining and collimating the outputs of the two mirrors into a single, stereoptically complete composite image having narrow alternate horizontal segments supplied from the respective left and right stereoptic input mirrors. The image, thusly combined, is then photographed or electronically scanned, recorded (or otherwise stored) or transmitted by substantially conventional television broadcast methods. The finished print or output cathode ray tube display then contains the total information derived by the stereoptic input mirrors with alternate horizontal segments relating to the half image from a respective one of the input mirror elements.

An image sorting grid spatially correlated to the masking grids at the input mirrors and to the spacing and width of the sets of the horizontal segments on the composite display is disposed a small but finite distance in front of the planar presentation screen and is substantially parallel thereto. A viewer, then, further from the screen display and whose eyes are on the line precisely parallel to the length of the horizontal segments of the display may, by moving his head up or down, selectively view either of the two sets of horizontal segments on the display due to the masking or shadowing effect of the image sorting grid by virtue of its optical parallax relation between the screen and the eyes of the viewer. With the image sorting grid appropriately spaced in front of the screen with respect to its distance from the viewer, an elevation change of a few millimeters causes a shifting to complementary non-masked image halves seen from those portions provided from the left input stereoptic mirror and the right input stereoptic mirror or vice versa dependent on the initial view. It follows then that if one eye of the viewer is maintained slightly higher than the other, as by a slight tilting of the head with respect to the direction of the lateral axis of the horizontal segments in the screen, one eye will view the left image half and the other the right image half. It may also be noted that the finite distance is an aid to stereoptical cueing. The result is a realistic and optically accurate integral perception of the stereoptic information as originally viewed at the input mirror elements.

It may be noted that the viewing distance from the screen which is dependent on the dimensions of the striae of the image sorting grid, as well as the viewing angle to the screen is not critical. Furthermore, the degree of tilting of the head or screen is not critical in practice. These and other tolerances are relatively large. Because of the very large degree of psychological adjustment made by the human brain, the principle of "closure" automatically operates to extrapolate or fill in blank or imperfectly masked spaces with any missing portions of the expected image. The "closure" ability is enhanced by the normal resolution limits of the eye; an ability often taken advantage of by techniques employed in the graphic as well as television arts. It is further to be noted that in the case of a television presentation wherein the image raster is correlated with the masking grids, in accordance with the principles of the present invention, maximum integrated brightness from the screen and perceived by the brain furnishes a guidance signal which the viewer uses subconsciously to maintain his head in proper and effective positions.

As implied above, the application and advantages generally of three dimensional display are well known. However, the following list of areas of use is indicative of the wide and varied need for compact, low cost three dimensional viewing and display: industrial process and control techniques; remote control docking of vehicles such as freight carriers or space platforms; recording of motor vehicular traffic violations; inventory of non-countable goods; surgery monitoring; event monitoring; in dangerous or inaccessible areas such as in radiation, underwater, high voltage or explosive environments.

BRIEF DESCRIPTION OF THE DRAWING

Further details of these and other novel features and their principles of operation as well as additional objects and advantages of the invention will become apparent and be best understood from a consideration of the following description when taken in connection with the accompanying drawings which are all presented by way of illustrative example only and in which.

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard no attempt has been made to show structural details of the apparatus in more detail than is necessary for a fundamental understanding of the invention. The description taken with the drawings will make it apparent to those skilled in the electronics, communications, and optical arts how the several forms of the invention may be embodied in practice. Specifically, the detailed showing is not to be taken as a limitation upon the scope of the invention which is defined by the appended claims, forming, along with the drawings, a part of this specification.

BRIEF DESCRIPTION OF THE PREFERRED EMBODIMENT

Figures 1, 2, 3, 4:
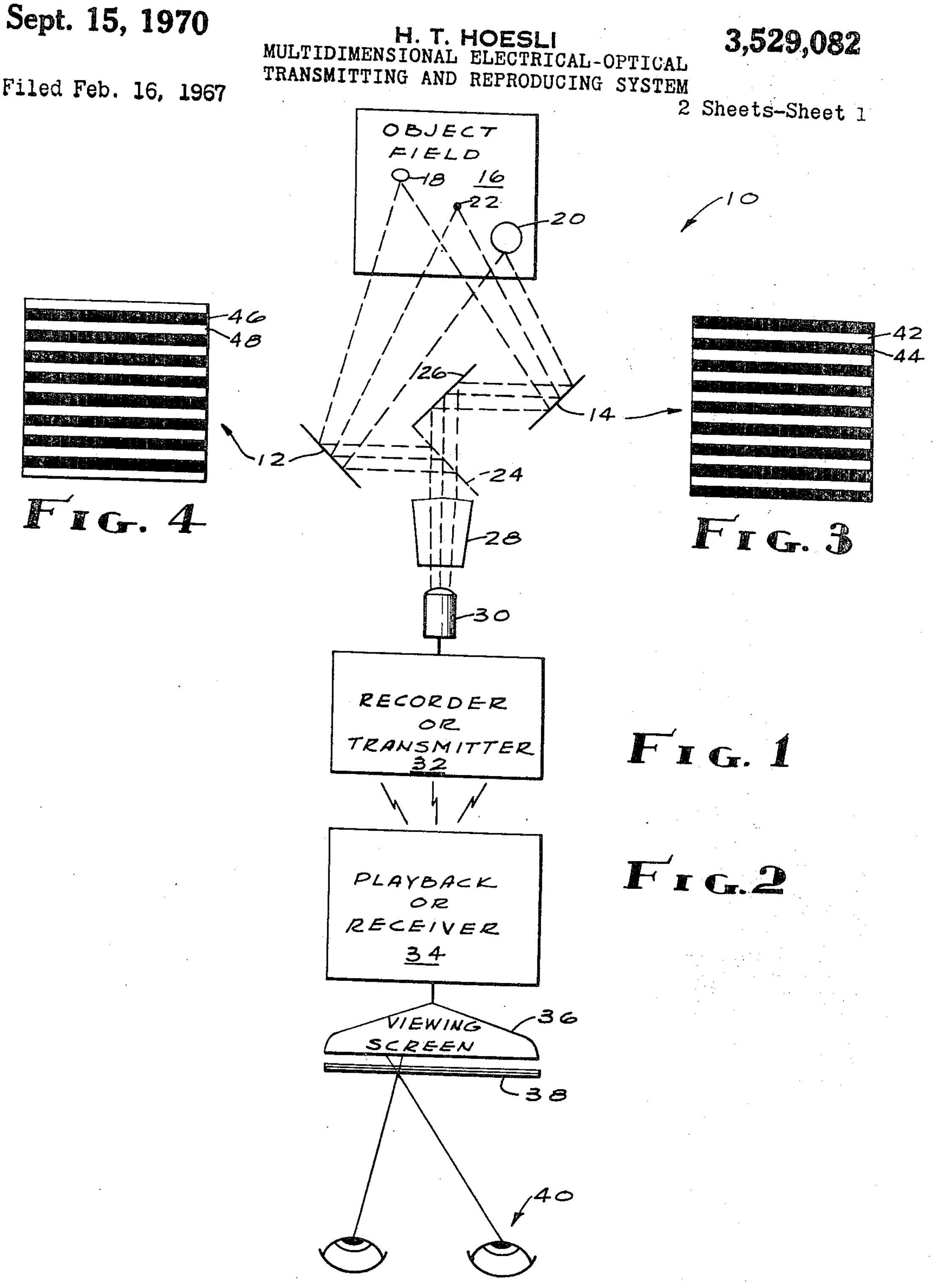
FIG. 1 is a schematic plan view of the camera or input portion of an example of a three dimensional electrical optical system constructed in accordance with the principles of the present invention.
FIG. 2 is a schematic plan view of a display presentation portion thereof.
FIG. 3 is a plan view of a right stereoptic input mirror element thereof.
FIG. 4 is a similar view of the left, complementary stereoptic input mirror element thereof.

In FIG. 1, the example of the three-dimensional electrical optical system 10 shown includes a pair of laterally stereoptically separated, left and right input mirror elements 12, 14 respectively which are exposed toward a three dimensional object field 16 which, shown in plan view, includes, for illustrative purposes, a small diameter upright cylinder 18, a large diameter upright cylinder 20, and a tall, pole-like figure 22. The light signal outputs of the input mirror elements 12, 14 are directed toward a respective one of a pair of combining mirror elements 24, 26 which cooperatively combine the signals and optically collimate to predetermined spatial occupancy. As shown, the mirror element 24, or both 24 and 26 for equal transmission characteristics, is essentially a beam splitter. The signals are then transmitted through an appropriate lens system 28 to a transducing element such as, in this example, a television camera 30 which may be a vidicon tube, image orthicon tube or the like. The optically collimated signals are scanned at the vidicon cathode in the same dimensional ratio of the mirror grid in typical interlace television sequence. The electrical output signals from the camera 30, representative of the combined, composite image from the stereoptic mirror system, are fed into, for example, a video tape recorder or television transmitter system 32.

In the case of the television transmitter system, the video signals, representative of the combined stereoptic images are broadcast or otherwise transmitted to a playback or receiver system 34; see FIG. 2. The output of the receiver 34 is impressed upon a cathode ray tube display screen 36 in a manner to recreate the composite combined image seen by the television camera 30. An image separating screen 38 is shown interposed between a viewing location 40 represented in the figure by a pair of human eyes, in plan, with the viewing screen 36 disposed in a relatively closely juxtaposed relationship to the image separating screen 38

Referring to FIG. 3, an interlaceable, half-image forming, grid pattern 42 is shown disposed on the reflecting surface 44 of the right stereoptic input mirror element 14. Similarly the input mirror element 12 of FIG. 4 includes, a half-image forming, grid pattern 46 disposed on its reflecting surface 48. The grid pattern 46 is interlaceable with the pattern 42 of the right input mirror element 14.

In this particular example, the input mirror elements are vertically oriented and the striations of their respective grid patterns are horizontal. The grid patterns 42, 46 may be designated as interlaceable gratings and are sufficiently fine that the images transmitted thereby do not, when enlarged to conventional viewing size, present obvious striations which are normally resolvable by the viewing eye. It is further indicated in the drawing that the vertical widths of the masking striations in each of the grid patterns 42, 46 are substantially equal to the unmasked segments so that when the images transmitted by the pair of grid patterns are recombined, the half images neither appreciably overlap each other nor exhibit image gaps between the interlaced image patterns.

Figure 5:
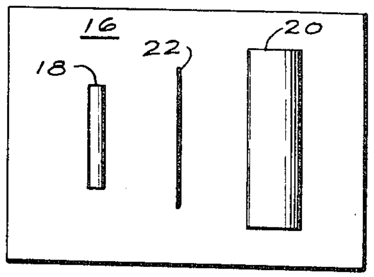
FIG. 5 is a schematic frontal elevational display of the object field shown in FIG. 1 as would be seen by a conventional camera system at a location midway between the stereoptic input mirror elements.

Referring to FIG. 5, a non stereoscopic view of the object field 16, as from the mid point between the object input mirror elements 12, 14, is presented. In this view the small diameter cylindrical object 18, the slender pole element 22, and the large diameter cylindrical figure 20 are shown in elevation.

Figure 6:
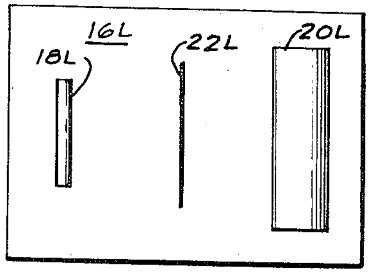
FIG. 6 is a similar view of the object field as seen at the left input mirror element.
Figure 7:
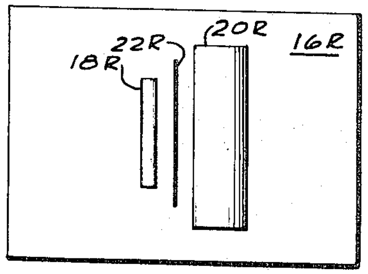
FIG. 7 is a similar view of the object field as seen at the location of the right input mirror element.

In FIG. 6, the object field 16 is shown as viewed from the input mirror element 12 and is designated $16_L$ as indicating that it constitutes the left hand stereoptic view, of the object field. Similarly in FIG. 7, the right hand stereoptic view of the object field 16 as seen from the right hand input optic mirror element 14 is presented and is designated $16_R$. The different objects within the stereoscopic object fields $16_L$ and $16_R$ are designated respectively with the subscript L and R. The presentations of FIGS. 6 and 7 may be considered as the optical or light signal input to the mirror elements 12, 14, respectively, while the reflected output light signal of these elements is substantially the same except that each is masked to provide a striated half image consisting of horizontal, elongated image segments corresponding to those portions of the input signals as seen in FIGS. 6 and 7 which have not been absorbed by the grating or grid patterns 44, 46.

Figure 8:
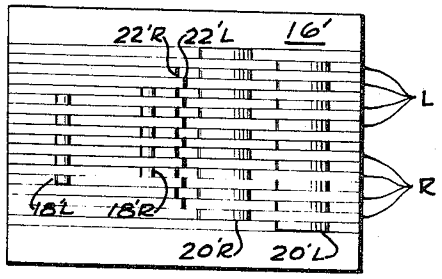
FIG. 8 is a similar view of the optically combined images for both input mirror elements.

In FIG. 8, the light output signals from the combining mirror elements 24, 26, which are, in this example, a beam splitter mirror configuration, as seen at the television camera 30, are shown as a composite of the half-images which constitute the output signals from the mirror elements 12, 14. The interlaced nature of the composite of half-images is apparent from the figure with the different objects in the object field being designated as in the previous figures with the appropriate subscript indicating which stereoptic image half left or right they relate to, and in addition are primed. To indicate their striated image character along the right hand edge of the figure, an indexing is presented which indicates which of the striated image segments have been transmitted, reflectingly, from the left and right input mirror elements, respectively.

The composite image designated 16' of FIG. 8 is video recorded or transmitted by the system 32 of FIG. 1. In a particularly practical example of the invention, the traces of the vidicon or orthicon camera tube are optically aligned and collimated with each of the grating striations on the input mirror elements 12, 14. That is, the raster of het camera tube is collimated with the grid pattern of the masking elements in a manner whereby, for example, odd numbered traces of the raster pick up the half image striations from the input mirror element 14 while the even numbered lines of the raster pick up the image half of the striations from the input mirror element 12. Whether the indicated correlation between raster and grid segments is utilized or not, the composite image received at the camera element 30 from the combining mirror elements 24, 26 is effectively transmitted to the playback or receiver system 34 is reproduced on the cathode ray type viewing screen 36.

Figure 9:
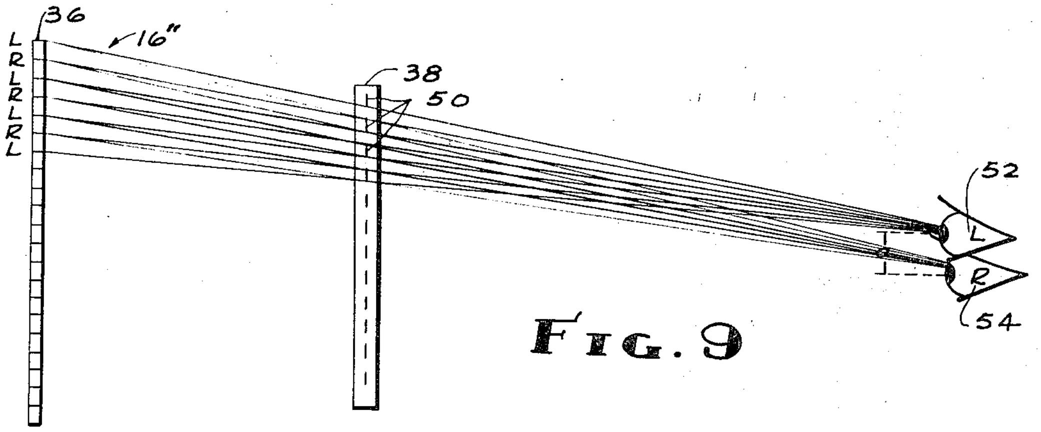
FIG. 9 is a schematic side elevational diagram of a portion of the display component shown in FIG. 2.

Referring to FIG. 9 the face of the viewing screen 36 is shown schematically as having the composite image segments of the presentation 16' reproduced thereon and as such are designated 16''. The image segments on the screen 36 making up the composite image 16'' are designated in the figure as L or R as indicating from which of the input mirror elements they originally came and these segment designations correspond to those marked with a subscript L and a subscript R, respectively in FIG. 8.

Disposed closely in front of the screen 36 in a juxtaposed relation therewith is the image separating screen 38. In the figure its distance from the screen 36 is exaggerated for purposes of clarity of illustration. The image separating screen 38 may be considered as being substantially transparent except for a seat of masking segments 50 which are parallel to and substantially collimated spatially with a set of the half image segments which are shown reproduced upon the screen 36. The relationship is such that from a viewing point designated 52 and represented in the figure by a human eye L, one half of the viewing screen 36 is masked from view by masking segments 50 and the half which is masked is fairly precisely that half comprising the image half segments labeled in the figure R, while permitting a substantially clear view of those image segments labeled L in the figure.

For the viewing position 54, represented by the human eye labeled R in the figure and separated in elevation by a distance *a* which may be of the order of a few millimeters, the same image separating screen 38 with its masking segments 50 permits a full view of those image segments labeled R on the screen 36 while masking those labeled L.

It will be realized from the above description of apparatus and method that the necessary and sufficient conditions for stereoscopic viewing at the display screen 36 of a composite image generated and transmitted at the transmitter system end are met. Furthermore, as discussed above, the relative position of the viewing locations 52, 54 with respect to the screen 36 and the image sparating apparatus 38 is not critical nor is the vertical diesparity or elevational separation *a* of the left and right eyes of the viewer. In practice it is found that several different magnitudes of separation provide good stereoptic image separation by the pair of eyes and this aspect of the system and method of the invention permits considerable versatility and comfort for the viewer in permitting him to change his position and orientation of neck and head whenever desired. Again, any minor deviations from optimum positions or elevations separation of the eyes is ultimately apparent, and any desired positional adjustment by the viewer is readily and conveniently accomplished due to the many stero perceptible positions available.

Accordingly, there have thus been disclosed and described a number of structural and method aspects of the invention which exhibit the advantages and achieve the objects set forth hereinabove.

What is claimed is:

1. An electrical-optical multi-dimensional system for presenting a plurality of partial images in interlaced relationship for multi-dimensional viewing, comprising:

a first mirror means for reflecting one group of image segments for a first partial image, said first mirror means defining a first grid pattern of horizontal striations for reflecting said one partial image transversely into a predetermined optical axis;

a second mirror means for reflecting another group of image segments for a second partial image, said second mirror means defining a second grid pattern of horizontal striations being interlaced with said first grip pattern, for reflecting said other partial image transversely into said predetermined optical axis;

third mirror means positioned along said optical axis for receiving said first and second partial images to thereby reflect said partial images along said optical axis with the segments thereof in interlaced relationship;

transducing means for receiving said partial images in interlaced relationship to provide a representative video signal;

playback display means for receiving said video signal to recreate said partial images in interlaced relationship; and image-separating screen means positioned adjacent to said playback means and defining spaced apart horizontal masking segments which are parallel to, and substantially collimated spatially with one of said partial images.

2. The invention according to claim 1 in which said display means comprises a substantially planar screen member and said grip means is a substantially planar array of substantially parallel, horizontal masking segments arranged substantially parallel to said interlaced image segments of said recreated composite image on said screen member, said masking segments being related in number to said image segments on a one-to-two basis, whereby from a first point in said predetermined viewing region, a first of the recreated said partial images is visible and the second is masked while from a second point in said predetermined viewing region the second of the recreated said partial images is visible and the first is masked. Said first and second points being displaced from each other along a line which is askew with respect to the length of said image segments.

3. The invention according to claim 1 in which said electrical optical transducing means comprises television camera means which includes means for spatially synchronizing the raster interlaced pattern of said camera with said narrow elongate segments of said interlaced composite image of said object field.

4. The invention according to claim 1 in which said means for providing said first and second mirror means comprise finely striated mask means disposed on the reflecting surface of a mirror element.

References Cited

UNITED STATES PATENTS

| | | | |
|---|---|---|---|
| 2,107,464 | 2/1938 | Zworykin | 178—6.5 |
| 2,301,254 | 11/1942 | Carnahan | 178—6.5 |
| 2,578,298 | 12/1951 | Goldsmith | 178—6.5 |
| 2,931,855 | 4/1960 | Abramson | 178—6.5 |
| 2,621,247 | 12/1952 | Wright | 178—6.5 |
| 2,756,363 | 7/1956 | Wright | 178—6.5 |

OTHER REFERENCES

Stereoscopic Television, "Wireless World," July 1953, pp. 296–298.

RICHARD MURRAY, Primary Examiner

J. A. ORSINO, JR., Assistant Examiner